United States Patent Office 3,580,962
Patented May 25, 1971

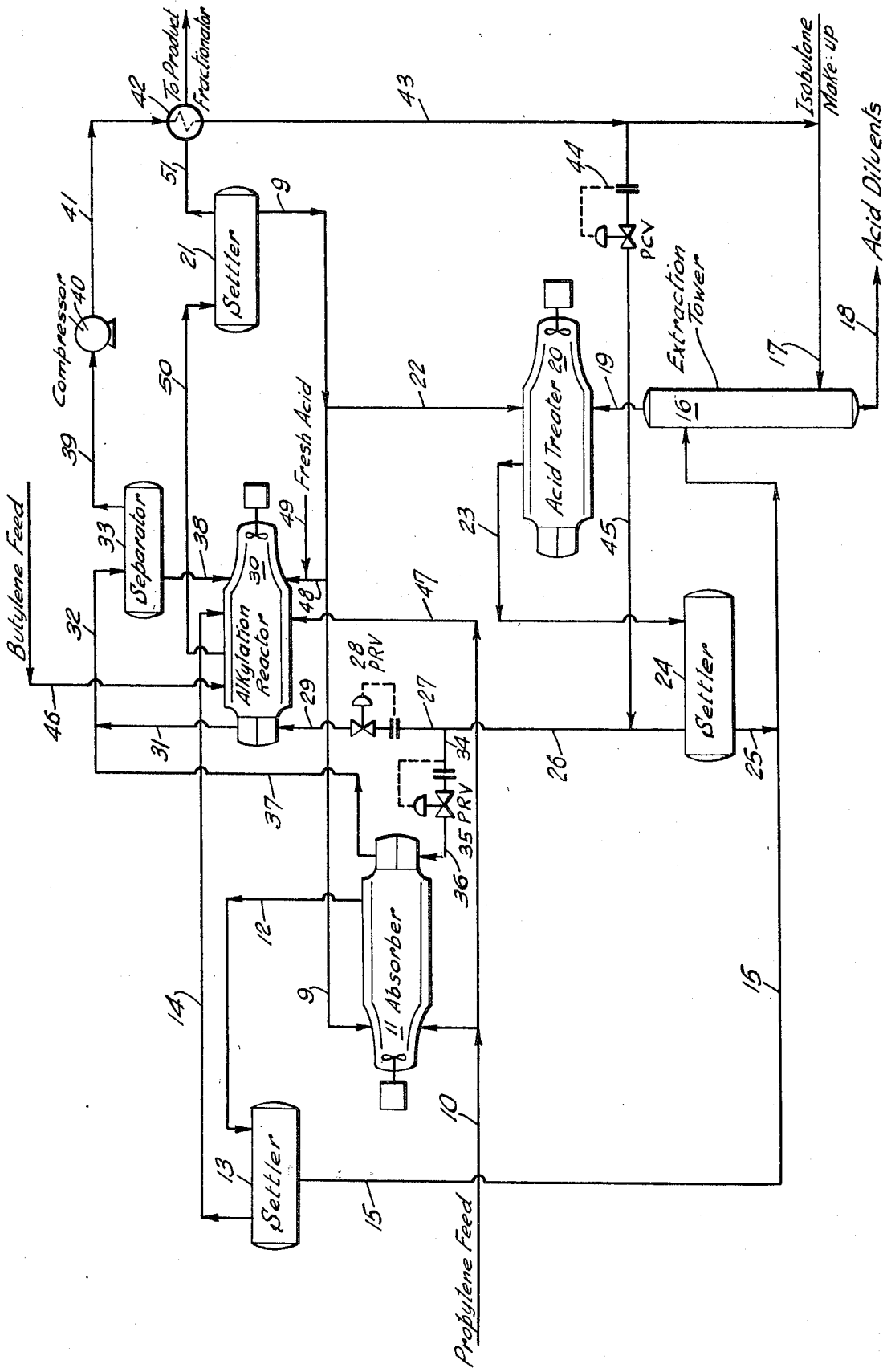

3,580,962
ALKYLATION PROCESS EMPLOYING FLASH
VAPORIZATION OF EXTRACTED AND
ACID-TREATED ABSORPTION PRODUCT
Henry D. Moorer, Richmond, Va., Ralph M. Lewis, Weston, Conn., and Richard W. Stokeld, Jr., Wappingers Falls, N.Y., assignors to Texaco Inc., New York, N.Y.
Filed June 30, 1969, Ser. No. 837,791
Int. Cl. C07c 3/54
U.S. Cl. 260—683.62    6 Claims

ABSTRACT OF THE DISCLOSURE

Method for refrigeration of a sulfuric acid alkylation process operated in conjunction with an associated acid recovery process involving reacting used acid with olefin feed in an absorber, extracting resulting dialkyl sulfates, acid treating the extract solution and passing the treated solution to alkylation. The acid treated extract solution is vaporized and passed in indirect exchange with contents of absorber and alkylation reactor. Vaporized isobutane may be separated, recompressed, cooled and returned as a liquid for combination with the acid treated extract stream for additional cooling capacity.

---

It is known that sulfuric acid alkylation catalyst may be recovered and regenerated in situ in the alkylation reaction zone by the absorption of an olefin in used sulfuric acid alkylation catalyst to form dialkyl sulfates, separation of the dialkyl sulfates, for example by extraction with isobutane, acid treatment of the isobutane extract solution of dialkyl sulfates and akyation of the dialkyl sulfates with isobutane using a sulfuric acid catalyst. In the alkylation step substantially pure 100 percent sulfuric acid is regenerated or recovered from the dialkyl sulfates. The effect of this regeneration is that less fresh make-up acid needs to be added to the alkylation zone, and the overall net acid consumption and costs are greatly reduced.

Both the alkylation reaction and the olefin absorption reactions are exothermic and some type of refrigeration must be employed to remove the heat of reaction from both zones. External refrigeration may be used but internal refrigeration method is simpler and more economical. One internal refrigeration method is termed effluent refrigeration. In this method the effluent from the alkylation reactor comprising the alkylation reaction mixture is passed to a settler wherein the hydrocarbon phase which usually contains 50% or more of isobutane is separated from the acid phase. The separated hydrocarbon is passed at a reduced pressure to a tube bundle or heat exchanger in contact with the alkylation reaction mixture. The heat of alkylation reaction causes vaporization of isobutane and resulting cooling. Another internal refrigeration method is termed emulsion flashing. In this method the entire effluent from the alkylation reactor is passed to a flash drum operated at a lower pressure. Vaporization of isobutane and other light hydrocarbons results in cooling of the liquid hydrocarbon phase and the acid phase. The liquid hydrocarbon phase which consists principally of isobutane and alkylate separated from the acid phase is passed into indirect heat exchange with the reaction mixture in the alkylation reactor and at least part of the separated acid returned to the alkylation reactor in direct heat exchange with the alkylation reaction mixture. A third internal method of cooling involves vaporization of a portion of the isobutane content of the alkylation reaction mixture within the alkylation reactor itself by controlling the pressure-temperature relationship such that the heat of reaction causes vaporization with resulting cooling inside the reactor.

In internal refrigeration methods of the prior art to obtain cooling in alkylation processes, the isobutane is admixed with alkylate which consists of normally liquid hydrocarbons with considerably higher boiling points than isobutane.

SUMMARY OF THE INVENTION

This invention relates to a new and novel internal refrigeration method for removing the exothermic heat of reaction and thereby controlling the reaction temperatures in a process for the alkylation of isoparaffins with olefins in the presence of strong sulfuric acid catalyst which process further includes conversion of used acid to dialkyl sulfates, isobutane extraction of the dialkyl sulfates from an acid phase containing most of the alkylation contaminants, acid treating of the isobutane-dialkyl sulfate extract, and charging the treated extract to the isoparaffin-olefin alkylation zone wherein isobutane is alkylated by the dialkyl sulfate with concomitant generation of 100% strength sulfuric acid. In accordance with the invention, the acid treated isobutane extract solution containing dialkyl sulfates is flash vaporized as a source of cooling and passed to the alkylation reactor and the olefin absorber in indirect heat exchange with the contents thereof to remove heat of reaction generated in these reaction vessels. Since the quantity of isobutane present in this treated extract is not sufficient to remove all of the process heat of reaction, the invention further contemplates that after heat exchange has been effected, the vaporized isobutane may be separated from the residual or unvaporized liquid constituents, recompressed and the resulting liquid isobutane recycled into indirect heat exchange with the contents of the alkylation reaction and the olefin absorber under isobutane vaporization conditions.

The method of this invention makes use of a process stream consisting of isobutane with dissolved diisopropyl-sulfate which is essentially free of higher boiling hydrocarbons, as is the case with internal cooling methods employed heretofore. This permits achieving an equal amount of cooling capacity with a smaller total quantity of coolant. Furthermore and even more importantly, since the vaporized portion of the cooling stream is substantially pure isobutane, these vapors may be recompressed with much greater ease and a savings in operating costs as compared with the internal refrigeration methods known heretofore. For example, whereas a compression ratio of 4.4 to 1 is required on an alkylation unit using conventional reactor effluent refrigeration, a compression ratio of only 3.8 to 1 is required when using the method of the present invention. This degree of reduction in compression ratio represents a significant operating improvement over the prior art. It results in decreased investment and operating costs.

BRIEF DESCRIPTION OF DRAWINGS

Having set forth its general nature, the invention will best be understood from the more detailed description hereinafter which refers to the accompanying drawing. Although the drawing illustrates one arrangement of apparatus in which the process of this invention may be practiced, it is not intended to limit the invention to the particular method or apparatus described.

The drawing shows an alkylation process with a separate absorber for olefin absorption wherein the alkylation reactor and olefin absorber are cooled by internal refrigeration in accordance with the present invention.

Referring to the drawing, an olefin stream in the liquid phase and comprising propylene with or without a lesser quantity of butylenes is passed through line 10 to absorber 11, where it is contacted with used sulfuric acid alkylation catalyst introduced into absorber 11 through line 9. The sulfuric acid absorbs propylene and butylenes forming the corresponding esters and the resulting absorber reaction mixture is passed through line 12 to settler 13. Hydrocarbon phase comprising unreacted hydrocarbon and a portion of the dialkyl sulfates formed in absorber 11 is passed from settler 13 through line 14 to alkylation reactor 30. A rich acid containing absorbed olefins is withdrawn from the bottom of settler 13 through line 15 and fed to extraction tower 16. In extraction tower 16 the rich acid phase is contacted in countercurrent flow with liquid isobutane solvent introduced through line 17. Weak acidic material containing contaminants, water and mono and dialkyl esters are withdrawn as raffinate or spent acid from the bottom of tower 16 through line 18. An extract solution of dipropyl sulfate in isobutane is withdrawn from the top of tower 16 through line 19 and passed to acid treater 20. Used alkylation acid from alkylation settler 21 is charged to acid treater 20 through lines 9 and 22. The reaction mixture from acid treater 20 is passed through line 23 to acid treating settler 24 and the acid phase separated in settler 24 is passed through line 25 to line 14 and thence to extraction tower 16 near the top thereof in admixture with the rich acid phase from settler 13.

Acid treated extract comprising isobutane and alkyl sulfates separated as the upper layer in settler 24 is passed from settler 24 through line 26 where it is divided into two portions. One portion is passed through line 27, pressure reduction valve 28, and line 29 to the cooling coils or tube bundle section of alkylation reactor 30 where it is warmed and at least a portion of the isobutane content thereof is vaporized by the heat of the alkylation reaction in reactor 30. The partially vaporized stream is then passed through lines 31 and 32 to separator 33. A second portion of the acid treated extract in line 26 is passed through line 34, pressure reduction valve 35 and line 36 to the cooling coils or tube bundle section of absorber 11 where it is warmed and at least a portion of the isobutane content thereof is vaporized by the heat of reaction of the absorption reaction in absorber 11. The partially vaporized stream is then passed through line 37 and combined with the similar stream in line 31 from alkylation reactor 30 and passed along therewith to liquid-vapor separator 33.

The liquid phase in separator 33 is passed through line 38 to alkylation reactor. Isobutane vapors separated in separator 33 are passed through line 39 to compressor 40 and the compressed vapors are passed through line 41 to product exchanger 42 where they are cooled and liquified by heat exchange with the hydrocarbon product phase from alkylation settler 21. The resulting liquid isobutane is passed through lines 43 and 17 to extraction tower 16. Make-up isobutane is added as required to the recycled isobutane stream. If desired, means are also provided for bypassing any desired portion of the recycle isobutane stream in line 43 through pressure control valve 44 and line 45 to line 26 where it is mixed with the acid treated extract stream from settler 24.

In addition to the liquid phase from separator 33, butylene feed through line 46, olefin feed through line 47 and recycle or used acid through lines 9 and 48 also are charged to alkylation reactor 30. Fresh make-up acid is introduced into alkylation reactor 30 through lines 49 and 48 as required. Alkylation reaction emulsion is passed through line 50 to settler 21. The used acid lower phase from settler 21 is passed through line 9 to absorber 11 and through lines 9 and 22 to acid treater 20 as described hereinbefore. The hydrocarbon upper phase from settler 21 comprising isobutane and alkylate is passed through line 51 and product exchanger 42 to a product fractionator, not shown.

DESCRIPTION OF PREFERRED EMBODIMENT

In order to illustrate more fully the nature of our invention and the manner of practicing the same, the following specific embodiment of our process is set forth with further reference to the drawing.

In an alkylation process operated in conjunction with a sulfuric acid recovery process, propylene feed is charged to absorber 11 through line 10 and used alkylation acid of about 90% titratable acidity is charged through line 9 to absorber 11 with the temperature in the absorber being maintained at 25° F. Olefins in the propylene feed react with the sulfuric acid content of the used acid to form dialkyl sulfate and alkyl acid sulfate. This reaction is exothermic and heat must be removed continuously from the reaction zone in order to maintain the temperature at or near 25° F. The reaction product from the absorber is separated in settler 13 into a hydrocarbon phase and an acid phase. The hydrocarbon phase which comprises alkyl sulfates and unreacted olefin and paraffin hydrocarbons is fed as a charge stock through line 14 to alkylation reactor 30. The acid phase which comprises dialkyl sulfates, alkyl acid sulfates, unreacted sulfuric acid and alkylation contaminants is sent through line 15 to extraction tower 16. Here the dialkyl sulfates in the acid phase are recovered by extraction with isobutane charged to extraction tower 16 through line 17. The isobutane extract from tower 16 is treated with used alkylation acid in acid treater 20 and the treated extract is separated from the treating acid in settler 24. This separated treated extract of dialkyl sulfate in isobutane is used for cooling the absorption and alkylation reaction zones as will be described hereinafter.

In addition to the hydrocarbon phase separated in settler 13, other streams also charged to alkylation reactor 30 are butylene feed through line 46, sulfuric acid alkylation catalyst through line 48, and dialkyl sulfate-isobutane extract through line 38. Additional propylene feed may be charged through line 47 if this should be found necessary in order to maintain a desired ratio of reactants in alkylation reactor 30. The alkylation of isoparaffins by olefins also is exothermic and heat of reaction must be removed continuously in order to maintain a desired temperature.

A portion of the reaction mixture or emulsion in alkylation reactor 30 is continuously withdrawn and passed to settler 31 where it separates into a hydrocarbon phase and an acid phase. The hydrocarbon phase is passed through exchanger 42 to a product fractionator (not shown) where alkylate is recovered as the desired product of the overall process. The acid phase is recycled—a portion to alkylation reactor 30 through lines 9 and 48, a portion to acid treater 20 through lines 9 and 22 and the remainder to absorber 11 through line 9.

The principal feature of the present invention involves the handling of the treated isobutane-dialkyl sulfate extract solution to enable the use of this material as a coolant to remove heat of reaction from absorber 11 and alkylation reactor 30. The use of this process stream for cooling has very real advantages over process streams used heretofore for internal cooling purposes which are not apparent from the teachings of the prior art. In accordance with our invention a portion of the acid treater effluent from settler 24 is flashed through pressure release valve 35 to the coolant exchanger in absorber 11 to provide refrigeration, and the flow rate is regulated as necessary to maintain the desired absorption temperature. The remainder of the acid treater effluent is flashed through pressure release valve 28 to coolant exchanger in alkylation reactor 30. Since the acid treater effluent flow rate ordinarily is insufficient to handle the total refrigeration load in the alkylation reactor, the flashed vapors and associated liquid are passed to separator 33 where the separated cold liquid comprising dialkyl sulfate and unvaporized isobutane solvent is separated and passed to alkylation reactor 30. The isobutane vapors are recycled by withdrawing from the upper portion of separator 33, recompressing, condensing by indirect heat exchange with the product stream from settler 21, and charging to extraction tower 16 in admixture with fresh isobutane being supplied to the system through line 17. In the event it is not desired to recycle all of the isobutane to extraction tower 16, any desired portion may be passed through pressure control valve 44 and line 45 and combined with the treated extract solution from settler 24 for reflashing to provide additional cooling.

In an alkylation sulfuric acid recovery process unit which charges 35% propylene-65% butylene and produces 5000 BPOD alkylate, acid consumption is typically about 0.5 lb./gal. alkylate. An associated sulfuric acid recovery process as described hereinbefore reduces the fresh acid make-up rate to 0.1 lb./gal. alkylate. Table I shows test results on the feedstocks, and Table II, presents a general material balance around such a unit operating with the following conditions:

| | |
|---|---|
| Alkylation reactor temperature, °F. | 45 |
| Olefin space velocity | 0.28 |
| Vol. percent iC$_4$ in reacted mix | 70 |
| Vol. percent acid in emulsion | 50 |
| Vol. percent acid in recycle acid | 85 |
| Fresh acid acidity, Wt. percent H$_2$SO$_4$ | 98.0 |
| Spent acid acidity, Wt. percent H$_2$SO$_4$ | 90.0 |
| Alkylation reactor mixer horsepower | 400 |

The heat load on the cooling system for removal of the heat of reaction, mixing power input, and sensible heat in the alkylation reactor and olefin absorber is approximately 9,000,000 B.t.u./hr. with the heat load on the absorber being about 993,000 B.t.u./hr. Cooling in the absorber can be provided by flashing 32 BPH of acid treater effluent through the coolant exchangers of the absorber. Refrigeration for the alkylation reactor requires that 262 BPH of isobutane be flashed through the coolant exchanger. Thus, a total refrigerant recycle rate (compressor 40 output) of 294 BPH will provide sufficient refrigeration for the combined alkylation/SARP system if all the 294 BPH of isobutane is vaporized. It is preferred that only 60–80% of the total refrigerant-effluent stream is vaporized so that some liquid is present in the coolant exchangers to achieve good heat transfer. Therefore, the isobutane make-up rate to the refrigeration system is from 86 to 193 BPH. The preferred rate to the extractor is 193 BPH. This isobutane solvent rate to the extraction tower can consist of isobutane make-up and/or recycle refrigerant.

The major advantage of using the acid treater effluent for refrigeration instead of the alkylation reactor effluent is that the isobutane refrigerant is not mixed with the alkylate product which tends to reduce its vapor pressure. Therefore, a lower compression ratio is required for the refrigeration which reduces investment and operating costs. For instance, a compression ratio of about 4.4/1 may be required on a unit using conventional alkylation reactor effluent refrigeration whereas only a compression ratio of 3.8/1 is necessary when using the refrigeration system of the present invention. Consequently, a less expensive compressor can be used with the lower compression ratio, and power consumption is reduced about 10%.

TABLE I.—FEED STOCK COMPOSITIONS

| | Propylene feed | Butylene feed | Isobutane feed |
|---|---|---|---|
| Composition, vol. percent: | | | |
| Ethylene | 1.3 | 0.1 | |
| Propylene | 55.9 | 5.6 | |
| Propane | 35.1 | 3.8 | 6.3 |
| Isobutane | 4.5 | 40.6 | 91.1 |
| n-Butane | 0.8 | 12.2 | 2.6 |
| Butylenes | 1.6 | 35.8 | |
| n-Pentane | 0.8 | 1.9 | |
| Total | 100.0 | 100.0 | 100.0 |

TABLE II

Material balance

| Stream: | Flow rate B.P.O.D. |
|---|---|
| Propylene feed | 1,302 |
| Butylene feed | 5,221 |
| Isobutane feed | 3,492 |
| Total isobutane to extractor | 23,209 |
| Fresh acid | 33 |
| To product fractionator | 8,501 |
| Light hydrocarbons | 3,501 |
| Alkylate | 5,000 |
| Acid diluents discharged | 68 |

Heat transfer is more efficient in the alkylation unit refrigeration system of this invention than in conventional refrigeration alkylation unit systems. Part of the heat in the alkylation reactor is removed by direct heat exchange of the cold vapor-liquid separator bottoms with the reaction mixture. In conventional systems, all heat is removed by indirect heat exchange.

Obviously, many modifications and variations of the invention, as hereinbefore set forth, may be made without departing from the spirit and scope thereof, and therefore only such limitations should be imposed as are indicated by the appended claims.

We claim:

1. In an alkylation process which includes the steps of charging isoparaffin, olefin, dialkyl sulfate alkylation reactants and sulfuric acid catalyst to an alkylation reaction zone, withdrawing from said alkylation reaction zone an alkylation emulsion effluent comprising hydrocarbon and sulfuric acid catalyst, separating said emulsion effluent into a hydrocarbon portion and a used acid portion, passing said used acid portion as a first reactant into an absorption zone, passing olefin as a second reactant to said absorption zone to form an absorption reaction mixture including dialkyl sulfate separating said reaction mixture into a hydrocarbon phase and an acid absorption phase, passing said hydrocarbon phase to said alkylation reaction zone, extracting said acid absorption phase in an extraction zone with said isoparaffin under liquid phase conditions thereby recovering dialkyl sulfate remaining in said acid absorption phase as a solution of dialkyl sulfate in isoparaffin hydrocarbon solvent, contacting said solution of dialkyl sulfate in said isoparaffin hydrocarbon solvent in an acid treater with strong sulfuric acid, separating said contacted solution into an acid treater hydrocarbon phase comprising an acid treated solution of dialkyl sulfate in said isoparaffin solvent and an acid treater acid phase, the invention comprising passing said acid treater hydrocarbon phase through a pressure reducing zone causing vaporization of a portion of said solvent constituent with a resulting reduction of temperature of said hydrocarbon phase, and passing said cooled acid treater hydrocabon phase from said treater in indirect heat exchange relationship with said process reactions for removal of the exothermic heat of reaction.

2. A process in accordance with claim 1 wherein said process reactions in indirect heat exchange with said cooled acid treater hydrocarbon effluent are said alkylation zone and said absorption zone.

3. A process in accordance with claim 2 wherein said first and said second reactants in said absorption zone are in indirect heat exchange with said cooled acid treater hydrocarbon phase.

4. A process in accordance with claim 2 wherein the reactants in said alkylation zone are in indirect heat exchange with said cooled acid treater hydrocarbon effluent.

5. A process in accordance with claim 1 wherein said cooled acid treater hydrocarbon effluent after indirect heat exchange with said process reactions is liquified by compressing and cooling and recycled to said extraction zone as solvent for said dialkyl sulfates.

6. A process in accordance with claim 1 wherein said cooled acid treater hydrocarbon effluent after indirect heat exchange with said process reactions is liquified by compression and cooling and passed into admixture with said acid treater hydrocarbon effluent.

References Cited
UNITED STATES PATENTS

| | | | |
|---|---|---|---|
| 2,988,580 | 6/1961 | Smith et al. | 260—683.62 |
| 3,097,250 | 7/1963 | Davies | 260—683.62 |
| 3,121,126 | 2/1964 | Goldsby et al. | 260—683.59 |
| 3,234,301 | 2/1966 | Goldsby | 260—683.61 |
| 3,422,164 | 1/1969 | Goldsby | 260—683.61 |
| 3,448,168 | 6/1969 | Goldsby | 260—683.61 |

DELBERT E. GANTZ, Primary Examiner

G. J. CRASANAKIS, Assistant Examiner

U.S. Cl. X.R.

260—683.61

UNITED STATES PATENT OFFICE
CERTIFICATE OF CORRECTION

Patent No. 3,580,962      Dated May 25, 1971

Inventor(s) Henry D. Moorer et al.

It is certified that error appears in the above-identified patent and that said Letters Patent are hereby corrected as shown below:

Column 1, line 34, "akyation" should read -- alkylation --.
Column 4, line 45, "31" should read -- 21 --.

Signed and sealed this 27th day of June 1972.

(SEAL)
Attest:

EDWARD M. FLETCHER, JR.
Attesting Officer

ROBERT GOTTSCHALK
Commissioner of Patents

FORM PO-1050 (10-69)